No. 664,132.  
W. D. & R. W. DENTON.  
MOUNT FOR ENTOMOLOGICAL SPECIMENS.  
(Application filed Sept. 15, 1900.)
Patented Dec. 18, 1900.
(No Model.)
3 Sheets—Sheet 1.
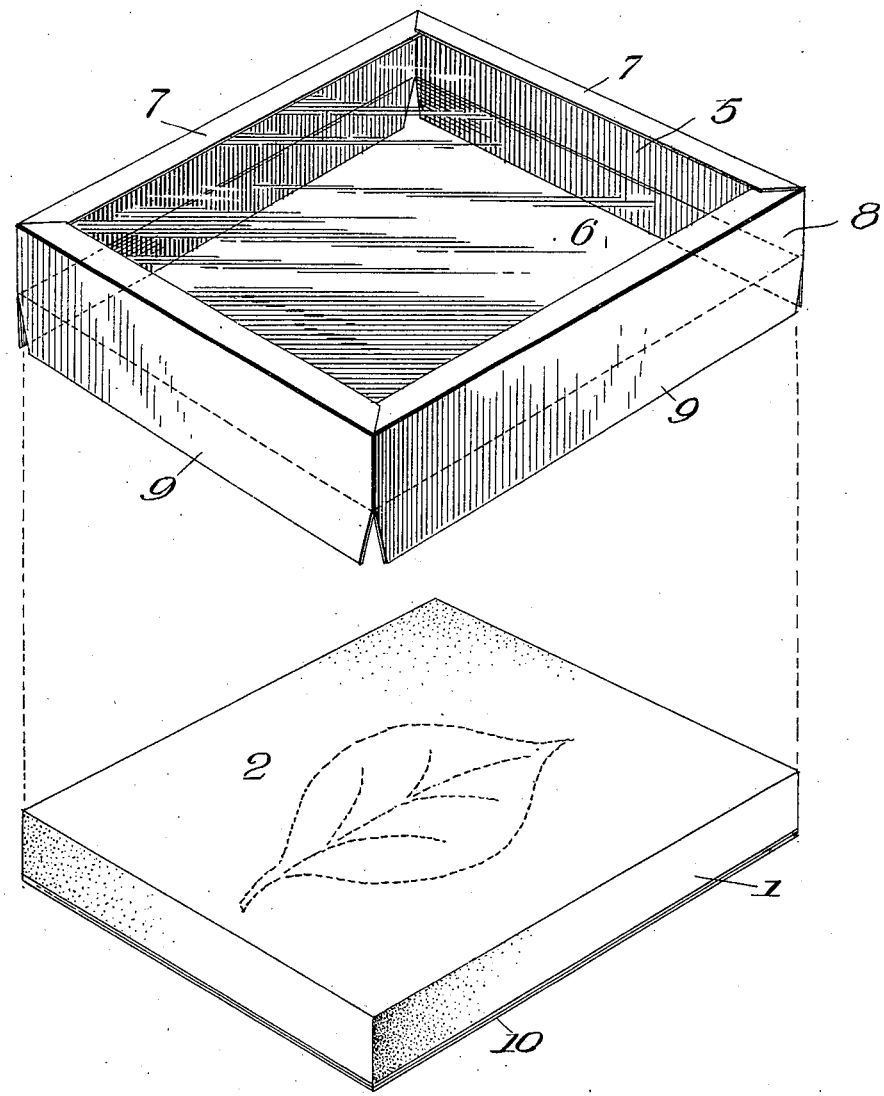
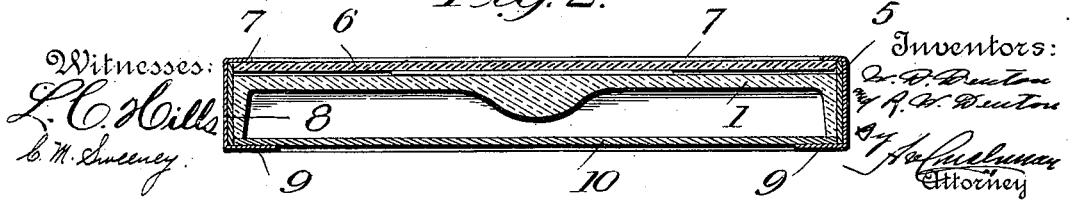

No. 664,132. Patented Dec. 18, 1900.
W. D. & R. W. DENTON.
MOUNT FOR ENTOMOLOGICAL SPECIMENS.
(Application filed Sept. 15, 1900.)
(No Model.) 3 Sheets—Sheet 2.
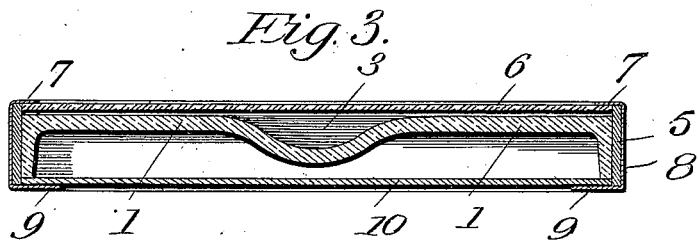
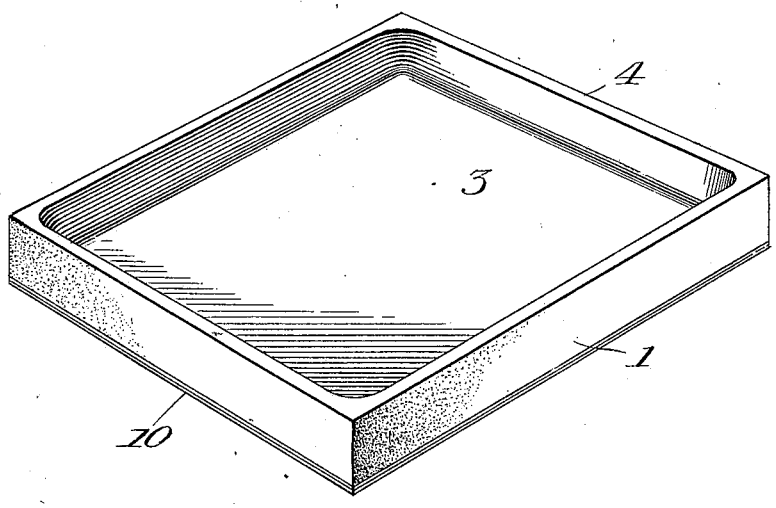
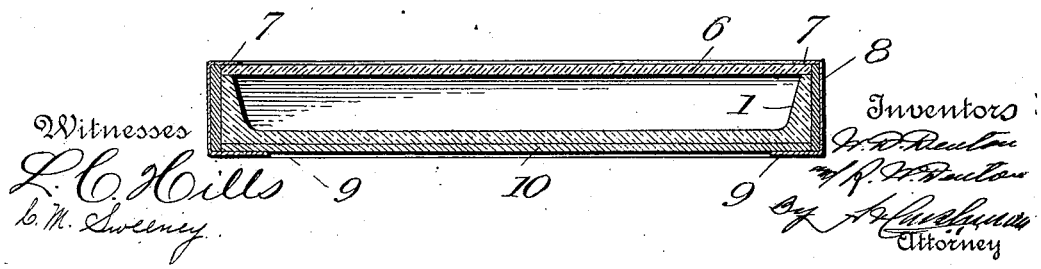

No. 664,132. Patented Dec. 18, 1900.
W. D. & R. W. DENTON.
MOUNT FOR ENTOMOLOGICAL SPECIMENS.
(Application filed Sept. 15, 1900.)
(No Model.) 3 Sheets—Sheet 3.
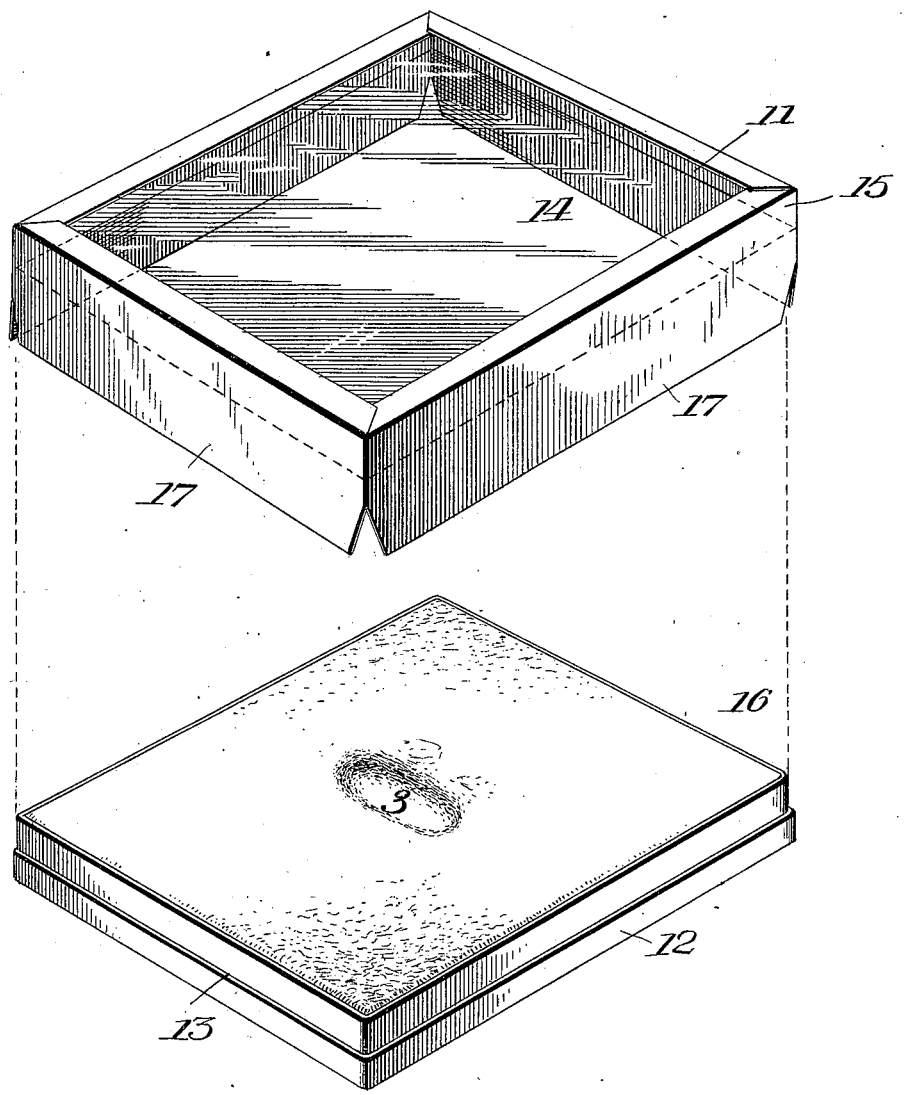
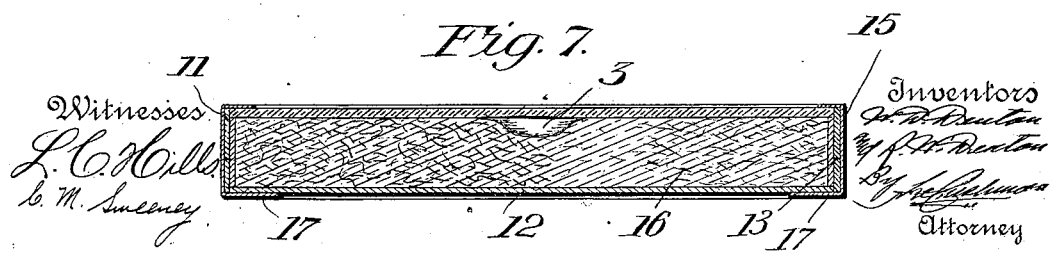

UNITED STATES PATENT OFFICE.

WILLIAM D. DENTON AND ROBERT W. DENTON, OF WELLESLEY, MASSACHUSETTS.

MOUNT FOR ENTOMOLOGICAL SPECIMENS.

SPECIFICATION forming part of Letters Patent No. 664,132, dated December 18, 1900.

Application filed September 15, 1900. Serial No. 30,093. (No model.)

*To all whom it may concern:*

Be it known that we, WILLIAM DIXON DENTON and ROBERT WINSFORD DENTON, citizens of the United States, residing at Wellesley, in the county of Norfolk and State of Massachusetts, have invented certain new and useful Improvements in Mounts for Entomological Specimens, of which the following is a specification.

Our invention relates to mounts for entomological, natural-history, and botanical specimens, and has for its object to provide means for mounting such specimens which is of such a character that it may be readily used by amateur collectors for mounting and preserving the more delicate entomological specimens—such as butterflies, moths, and those insects which require careful handling and skilful mounting to preserve and effectively display their beauties—as well as the fragile botanical specimens, marine growths, &c., and we have also provided one form of mount especially adapted for mounting fruits, seeds, shells, and bird-skins in an effective manner and in a way which preserves them in their natural appearance indefinitely.

Hitherto with the mounts known to us it has required skilful treatment and expert training to successfully mount, in such manner as to insure safety from the disfiguring effects of dust and the ravages of insects, these specimens, and with the object of providing a mount which will enable the ordinary collector, without the necessity of special training in mounting, to put up specimens in an attractive way, as well as to secure them from harm by reason of dust, moisture, the attacks of insects, and injury due to careless handling of the mounts, we have devised the mount illustrated in the drawings accompanying and forming a part of this specification and described in detail hereinafter, the novel features to which we lay claim as of our invention being set forth with particularity in the claims appended hereunto.

In the drawings referred to, in which like characters indicate like parts in the several views, Figure 1 is a perspective view of the two sections of a mount arranged in juxtaposition. Fig. 2 is a central vertical section of the mount, showing the parts assembled. Fig. 3 is a sectional view similar to Fig. 2 of a slightly different form of mount. Fig. 4 is a perspective view similar to Fig. 1 of a mount having a slightly different style of surface for receiving the specimens. Fig. 5 is a sectional view similar to Fig. 3 of the mount shown in Fig. 4. Fig. 6 is a perspective view similar to Fig. 1 of a slightly different form of our invention, and Fig. 7 is a central vertical section of the mount shown in Fig. 6.

Referring to the drawings by numerals, 1 designates a tablet or backing, shown in the present case as rectangular, though any desired shape or contour may be adopted, said backing being of any suitable material, such as plaster-of-paris, as shown in Figs. 1 to 5, inclusive, yielding material—such as fiber, cotton, and the like—as shown in Figs. 6 and 7, or any other material the surface of which may be readily adapted to receive and support the body of the specimen. Said backing 1 may have a plain flat field or supporting-surface 2 for the specimen, as shown in Figs. 1 and 2, which form of mount is especially adapted for use in mounting leaves, ferns, sea-weeds, and the like, or it may be formed with a depression or concavity of the size necessary to receive the particular specimen to be mounted, as shown in Figs. 3 and 4, such depression being centrally placed, as shown in Fig. 3, or covering practically the entire area of the backing, as shown in Fig. 4. It will be obvious that if it is desirable to mount more than one specimen on a single backing a plurality of small depressions may be formed in the surface of the backing to receive the several specimens. The form of mount shown in Fig. 3 is well adapted for mounting specimens having considerable body or thickness and projecting wings or other parts, the concavity 3 receiving the body of the moth, butterfly, or other insect, while the flat field surrounding said concavity supports the wings or other projecting parts of the specimens. In the form of the invention shown in Fig. 4, in which the depression 3 is large and covers substantially the entire area of the backing or tablet 1, the side walls 4 of said backing 1 are sloped on their inner faces, giving an artistic construction and strengthening the said walls at their bases, so that they are stronger and less likely to be broken, and a mount constructed with this style of backing is peculiarly fitted to receive bird-skins, fruits, seeds, grasses, &c., and all such specimens as require a considerable depressed area to accommodate them.

When the backing is formed of a yielding material, as shown in Figs. 6 and 7, where such backing is illustrated as being composed of a fibrous material, such as cotton and the like, the compressibility of such backing will permit the body of the specimen to sink into it and form the depression or cavity 3, if such concavity be not formed in the blank mount, and at the same time afford a supporting-surface on both sides of said depressed portion for the wings or other projecting parts, the fiber adjusting itself to the peculiarities of form of the specimen, so as to support and sustain all parts thereof. Furthermore, such fibrous backing forms a yielding support for the specimen and one which absorbs the shock incident to careless handling or falls, whereby danger of injury to the specimen or the mount is reduced to a minimum, and may, if desired, be impregnated with a preservative compound or an insecticide to more effectually preserve the specimen and guard it from the attacks of insects. Surrounding the said tablet or backing 1 is an inclosing frame or boxing comprising an upper and a lower section, said upper section 5 being formed in the present instance of stiff cardboard, although any thin rigid material—such as wood-veneer, sheet metal, &c.—may be used with good results. Said upper section 5 fits snugly the backing 1 and is provided at its top with a transparent plate 6, preferably of glass, which is preferably fitted within the upper section 5 at the top thereof, as shown in the drawings, and secured in place by means of flaps 7 on a paper strip 8, which covers and binds the frame or boxing together, said flaps 7 being pasted down upon the surface of the glass around the edges thereof. The glass 6 is preferably fitted, as shown, within the section 5, instead of being laid upon the top thereof, and when the mount is assembled rests upon the surface of the backing, the result of this construction being that the edges of said glass plate 6 are covered and protected by the walls of the section 5 and held thereby, thus obviating the danger of cutting or breaking the covering and binding strip 8 by reason of its contact with the sharp edges of the plate 6 and relieving said strip of excessive strain. This construction permits of the use of a paper for binding which is thin in quality and of light texture and therefore readily pasted down upon the glass. It will be apparent that if the glass 6 rested upon the edges of the section 5 instead of being fitted therein, as shown, a much heavier paper would have to be used to cover and bind the said section and glass together, and not only would difficulty be experienced in pasting the flaps of such heavy paper in place, but its use would also result in a mount less neat in appearance than that produced with the construction described, in which the thin paper covering and binding strip is used. The said covering and binding strip 8 is provided on its lower edge with depending flaps 9, which project beyond the walls of section 5 when the parts are assembled, said flaps 9 being adapted to be folded in and pasted to a bottom board or lower supporting-section 10, which supports the backing or tablet 1 and fits the section 5 closely, as seen in the drawings, said flaps 9, as well as the glass-securing flaps 7 above referred to, being of such width as to effectively close the cracks or interstices between the parts of the boxing, thus sealing the mount tightly, to the exclusion of dust and insects, which would injure the specimens.

It will be seen that in the form of the invention in which fibrous backing is used such fibrous backing will, when the parts of the mount are assembled, bear against the under side of and sustain the glass top or plate 6 and absorb to a large extent any shocks imparted to it, so that danger of breakage of the glass and consequent injury to the mount are avoided.

In the form of the invention shown in Figs. 6 and 7 we have formed the boxing in two parts comprising upper and lower sections 11 and 12, which are halved together, as at 13. In this construction the glass top 14 is secured by the covering and binding strip 15 in a manner similar to that described in connection with the form shown in Figs. 1 to 5, while the backing 16 is mounted in the lower section 12 instead of being carried by the bottom board or lower section 10, as in the construction shown in Figs. 1 to 5, said lower box-like section 12 with its contained backing being secured to the upper half or section 11 by means of the wide depending flaps 17 on the covering and binding strip 15, carried by the upper section 11, and said depending flaps 17 being pasted to the lower half or section 12, as clearly shown in Fig. 7. This construction, it will be seen, closes the cracks between the two sections 11 and 12 at their point of juncture, and this box-like lower section is well adapted for use in connection with the fibrous backing 16 for the reason that it preserves the shape of the mat of fiber and prevents its being torn or distorted.

It will be seen that by practicing the invention as herein set forth specimens of different kinds may be mounted very readily by any collector without the necessity of special training or expert knowledge. The specimen having been placed in position on the backing with its body lying in the depression or concavity and its wings supported upon the flat field surrounding said cavity, the lower section on which said backing is mounted is inserted in the upper section until its surface in which the specimen rests is in close proximity or touching the under side of the glass top of said upper section. The specimen will thus be held between the upper surface of the backing and the glass top in an immovable position and in such a manner as to display its beauties fully, while the inclosing frame or boxing will protect the glass, the backing, and the contained specimen from all danger of injury. The lower depending flaps of the covering and binding strip, which are left loose until the backing and specimen are in position within the boxing, are then pasted down and secured to the lower section, and the mount is complete. In case the blank fibrous mounts are sold with no depression or concavity formed in the fibrous backing the collector will simply lay the specimen upon the tablet or backing in proper position and gently press the top section down, causing the body of the specimen to sink into the backing and adjust itself in proper position, where it will be firmly held. While we prefer to paste the said depending flaps to the lower section of the mount, we do not limit ourselves to this particular method of securing the two sections together, as good results may be secured by simply folding the flaps under with a sharp bend, it being found that in the case of light mounts this will be sufficient to hold the sections together and seal the mount and so admit of a ready disassembling of the parts of the mount, if desired.

Mounts made in accordance with our invention admit of very rapid and at the same time accurate and neat work in mounting specimens. They are sealed against dust, moisture, and insects. The specimens and their supporting-backing are protected from injury, and the parts may be readily separated if for any reason it becomes necessary or desirable to remove the specimen without destroying the mount and unfitting it for further use.

It will be understood that we do not limit our invention except as specified in the appended claims and that any and all variations within the scope of the terms of said claims may be made without departing from the spirit of our invention.

Having thus described our invention, we claim and desire to secure by Letters Patent of the United States—

1. In a sealed mount for entomological, natural history or botanical specimens, the combination with a backing or tablet having an upper surface adapted to receive and support a specimen; of an inclosing and protecting frame or boxing for said backing comprising an upper section having a transparent top; a lower section upon which said backing rests; and a covering and binding strip secured to said upper section and having depending securing-flaps adapted to hold said lower section and its superposed backing in place.

2. In a sealed mount for entomological, natural history or botanical specimens; the combination with a backing or tablet having an upper surface adapted to receive and support a specimen; of an inclosing and protecting frame or boxing for said backing comprising an upper section; a transparent top fitted within said upper section; a lower section upon which said backing rests; and a covering and binding strip pasted to said upper section and having flaps by means of which said transparent top is secured in place; and depending securing-flaps on said strip adapted to hold said lower section and its superposed backing in place.

3. In a sealed mount for entomological, natural history, or botanical specimens; the combination with a backing or tablet having an upper surface adapted to receive and support a specimen; of an inclosing and protecting frame or boxing for said backing comprising an upper section; a glass top fitted within said upper section; a lower box-like section upon which said backing rests; and a covering and binding strip pasted to said upper section and having securing-flaps by means of which said glass top is held in place within said section; said strip having depending flaps adapted to be secured to the sides of the said lower box-like section and hold it and its superposed backing in place.

4. In a sealed mount for entomological, natural history, or botanical specimens; the combination with a backing or tablet having an upper surface formed with a depressed portion adapted to receive and support a specimen; of an inclosing and protecting frame or boxing for said backing comprising an upper section; a glass top fitted within said upper section; a lower box-like section upon which said backing rests; and a covering and binding strip pasted to said upper section and having securing-flaps by means of which said glass top is held in place within said section; said strip having depending flaps adapted to be secured to the sides of the said lower box-like section and hold it and its superposed backing in place.

5. In a sealed mount for entomological, natural history, or botanical specimens; the combination with a backing or tablet having an upper surface formed with a depressed portion adapted to receive and support a specimen, and provided with sloping side walls surrounding said depressed portion; of an inclosing and protecting frame or boxing for said backing comprising an upper section; a glass top fitted within said upper section; a lower section upon which said backing rests; and a covering and binding strip pasted to said upper section and having securing-flaps by means of which said glass top is held in place within said section; said strip having depending flaps adapted to be secured to said lower section and hold it and its superposed backing in place.

6. A sealed mount for entomological, natural history, or botanical specimens, comprising a backing or tablet of yielding material adapted to receive and support a specimen on its surface; a boxing or frame inclosing and protecting said backing; and a transparent plate secured to said boxing, and between which and said yielding backing the specimen is held.

7. A sealed mount for entomological, natural history, or botanical specimens comprising a backing or tablet of yielding, fibrous material adapted to receive and support a specimen on its surface; a boxing or frame inclosing and protecting said backing; a transparent plate secured in said boxing, and between which and said yielding backing the specimen is held; and a covering and binding strip secured to and surrounding said boxing.

8. In a mount for entomological, natural history, or botanical specimens; the combination with a backing or tablet formed of fibrous material, of an inclosing and protecting boxing or frame for said backing, comprising an upper section having a transparent top, and a lower section on which said backing rests, fitted to said upper section.

In testimony whereof we have hereunto set our hands in presence of two subscribing witnesses.

WILLIAM D. DENTON.
ROBERT W. DENTON.

Witnesses:
ALBERT JENNINGS,
SHERMAN F. DENTON.